(No Model.)
C. T. REED.
SULKY ATTACHMENT FOR PLOWS.
No. 263,217. Patented Aug. 22, 1882.
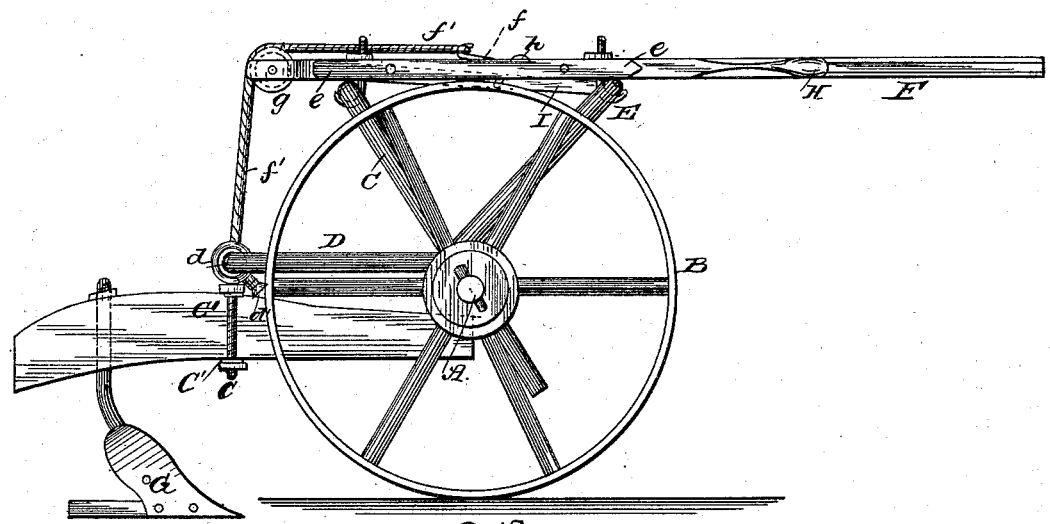
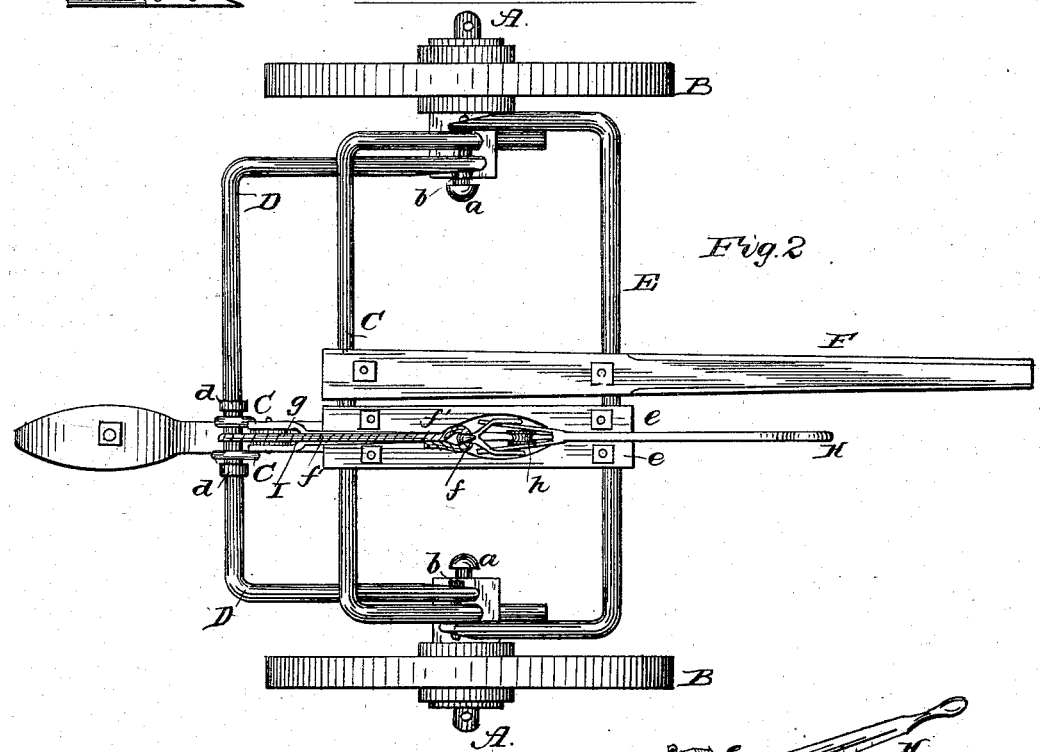
WITNESSES:
Fred. G. Dieterich
John G. Hinkel
INVENTOR.
Calvin T. Reed
by Louis Bagger & Co.
ATTORNEYS.

UNITED STATES PATENT OFFICE.

CALVIN T. REED, OF BLOOMINGTON, ILLINOIS.

SULKY ATTACHMENT FOR PLOWS.

SPECIFICATION forming part of Letters Patent No. 263,217, dated August 22, 1882.

Application filed May 29, 1882. (No model.)

*To all whom it may concern:*

Be it known that I, CALVIN T. REED, of Bloomington, in the county of McLean and State of Illinois, have invented certain new and useful Improvements in Sulky Attachments for Plows; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my improved sulky-plow. Fig. 2 is a plan view thereof, and Fig. 3 is a detailed view of the plow-adjusting mechanism.

This invention has relation to an improvement in sulky-plows, its object being to effect the ready adjustment of the plow with relation to the ground in a simple and expeditious manner; and it consists in the combination and arrangement of the elements, substantially as hereinafter more fully set forth and claimed.

In carrying out my invention I employ (as observed by reference to the accompanying drawings) two short axles, A, upon which are journaled the wheels B, and through which is passed (and capable of vertical adjustment therein by adjusting-screws $a$) a frame, C, preferably of an inverted-U shape and standing in nearly a vertical position. This admits the raising and lowering of the tongue and the other parts of the machine as may be desired. Connected to this frame by a common bolt, $b$, at each side is the plow-suspending bail D and a second frame, E, upon which and the frame C is supported and secured the tongue F. The plow-bail D is pivoted upon the bolt or axis $b$, to permit it to be raised and lowered in the arc of a circle to effect the adjustment of the plow or plows G, connected thereto. They may be connected thereto by the eyebolts $c$, clipped to the plow-beams by plates $c'$, arranged upon said bolts and one above and one below the beam. Collars $d$ are secured adjustably upon the bail by set-screws $d'$, one disposed upon the outer side of each of the screw or eye bolts of a plow-beam to secure them in position as against lateral movement, and to permit them to be readily adjusted upon the bail at any desired point.

H is a hand-lever pivoted to and between parallel bars $e$, bolted adjustably to the frames C E to permit them to be moved according to the adjustment of the plow-beams. It is designed to provide a rack suitably arranged upon either of the bars $e$, to hold the lever at its point of adjustment. To the lower end of this lever is connected by a pivoted hook, $f$, a chain or cord, $f'$, or its equivalent, connected to the plow-bail D.

I is a second lever, pivoted to and between the rear portions of the bars $e$, and having its rear end projecting beyond them a short distance, and provided with a grooved pulley, $g$, over which the cord or chain $f'$ is passed, and its forward end extended to a point forward of the lower end of the hand-lever H to permit the said end of the latter lever, which is provided with a grooved roll, $h$, to ride thereon as it is raised and lowered. The effect of this will be to cause simultaneously with the raising and lowering the plow-bail and plow the raising and lowering of the rear end of the lever I, which effects the adjustment of the plows or their bail to a more elevated point and through a greater space than if the cord or chain were passed over a fixed point on the upright frame, and consequently facilitates the operation of the machine. The levers H and I are fulcrumed near their pulleys, and power is advantageously applied by this arrangement, the short end of the lever H bearing on the long arm of the lever I, and the friction-roll $h$ allowing it to ride down the long arm of the lever I, while the lifting of the short arm of the lever I multiplies the amount of lift given to the bail.

I claim and desire to secure by Letters Patent of the United States—

In a sulky attachment for plows, the combination, with the wheel-supported frame C E, having tongue F and parallel bars $e\ e$, of lever H, having the grooved pulley $h$ and hook $f$, lever I, having the grooved pulley $g$, cord or chain $f'$, and hinged bail D, supporting the plow-beam, substantially as shown and specified.

In testimony that I claim the foregoing as my own I have hereunto affixed my signature in presence of two witnesses.

CALVIN THOMPSON REED.

Witnesses:
 JAMES T. WALTON,
 T. W. BELCHAM.